US009022368B2

(12) United States Patent
Marienfeld et al.

(10) Patent No.: US 9,022,368 B2
(45) Date of Patent: May 5, 2015

(54) MOTOR MOUNT FOR A MOTOR VEHICLE

(71) Applicant: ContiTech Vibration Control GmbH, Hannover (DE)

(72) Inventors: Peter Marienfeld, Marklohe (DE); Meinert Holst, Wunstorf (DE)

(73) Assignee: ContiTech Vibration Control GmbH, Hannover (DE)

( * ) Notice: Subject to any disclaimer, the term of this patent is extended or adjusted under 35 U.S.C. 154(b) by 140 days.

(21) Appl. No.: 13/768,501

(22) Filed: Feb. 15, 2013

(65) Prior Publication Data
US 2013/0161885 A1 Jun. 27, 2013

Related U.S. Application Data

(63) Continuation of application No. PCT/EP2011/060086, filed on Jun. 17, 2011.

(30) Foreign Application Priority Data

Aug. 26, 2010 (DE) .......................... 10 2010 037 178
Nov. 30, 2010 (DE) .......................... 10 2010 060 885

(51) Int. Cl.
F16F 13/26 (2006.01)
F16F 13/10 (2006.01)

(52) U.S. Cl.
CPC ............... F16F 13/266 (2013.01); F16F 13/26 (2013.01); F16F 13/10 (2013.01); F16F 13/262 (2013.01); F16F 13/105 (2013.01); F16F 13/107 (2013.01)

(58) Field of Classification Search
CPC ....... F16F 13/26; F16F 13/105; F16F 13/107; F16F 13/262

USPC .............. 267/140.11, 140.13, 140.14, 140.15
See application file for complete search history.

(56) References Cited

U.S. PATENT DOCUMENTS 4,789,142 A    12/1988  Hoying et al.
5,601,280 A *  2/1997   Nagaya et al. ........... 267/140.14
5,647,579 A *  7/1997   Satoh ....................... 267/140.14
(Continued)

FOREIGN PATENT DOCUMENTS

DE         103 46 309 A1    4/2005
JP         2000-283214 A    10/2000
WO         WO 2005/088159 A1  9/2005

OTHER PUBLICATIONS

International Search Report dated Sep. 15, 2011 of international application PCT/EP2011/060086 on which this application is based.

Primary Examiner — Thomas Irvin
(74) Attorney, Agent, or Firm — Walter Ottesen P.A.

(57) ABSTRACT

A switchable, hydraulic damping mount includes a work chamber filled with hydraulic fluid and a compensation chamber connected to the work chamber via a channel. A partition wall mutually separates the chambers. A ferromagnetic diaphragm is arranged in the partition wall and is deflectable. An electromagnetic switching actuator has a deenergized state and an energized state and controls the diaphragm. The switching actuator applies a magnetic holding force to the diaphragm and fixes the diaphragm in a rest position when the switching actuator is in the deenergized state and reduces the magnetic holding force to such an extent that the diaphragm is enabled for movement in the longitudinal direction of the mount when the switching actuator is in the energized state.

15 Claims, 6 Drawing Sheets

(56) References Cited

U.S. PATENT DOCUMENTS

| | | | |
|---|---|---|---|
| 5,950,756 A * | 9/1999 | Satoh et al. | 180/312 |
| 6,186,485 B1 * | 2/2001 | Kawazoe | 267/140.14 |
| 6,276,673 B1 * | 8/2001 | Hibi et al. | 267/140.14 |
| 6,439,556 B1 * | 8/2002 | Baudendistel et al. | 267/140.15 |
| 6,588,737 B2 * | 7/2003 | Goto et al. | 267/140.14 |
| 7,255,335 B2 * | 8/2007 | Muraoka et al. | 267/140.14 |
| 7,338,036 B2 | 3/2008 | Freudenberg et al. | |
| 8,104,750 B2 * | 1/2012 | Hasegawa et al. | 267/140.14 |
| 2005/0017420 A1 * | 1/2005 | Nemoto et al. | 267/140.14 |
| 2009/0079114 A1 * | 3/2009 | Muraoka | 267/121 |
| 2010/0301530 A1 * | 12/2010 | Koyama et al. | 267/140.14 |
| 2013/0256960 A1 * | 10/2013 | Marienfeld et al. | 267/140.14 |

* cited by examiner

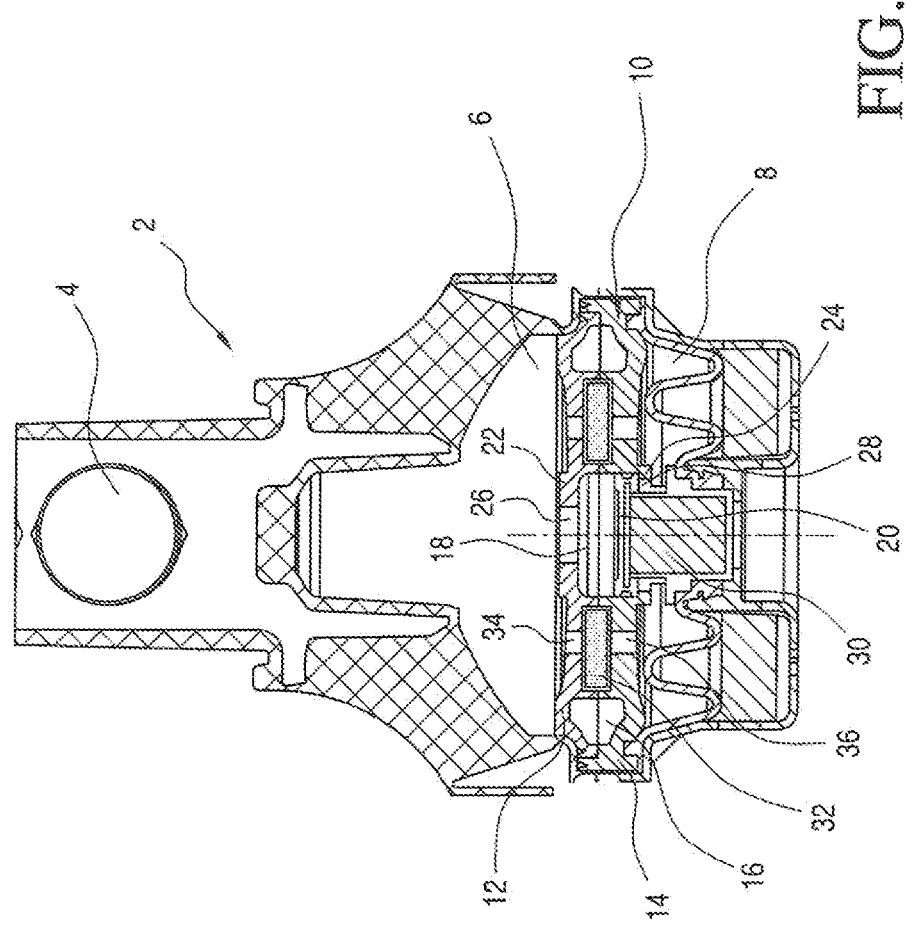

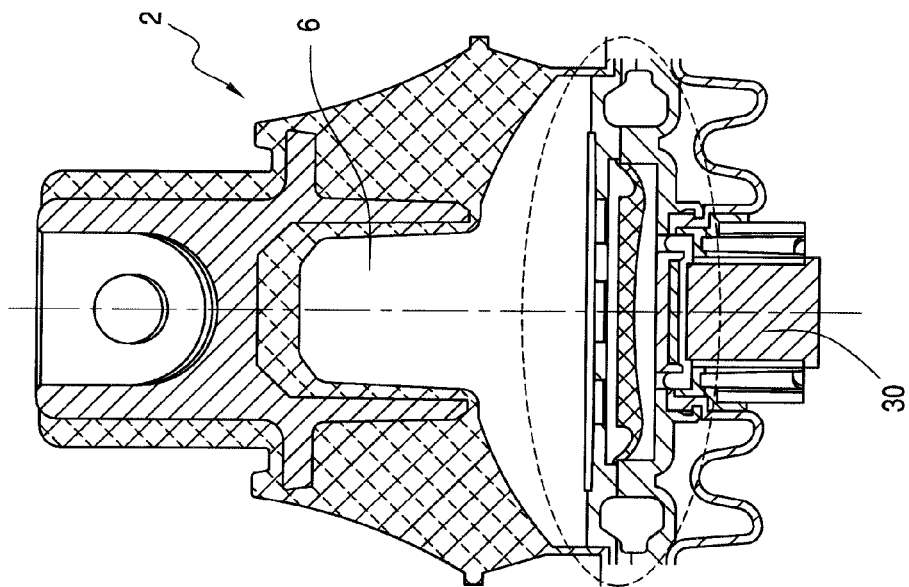
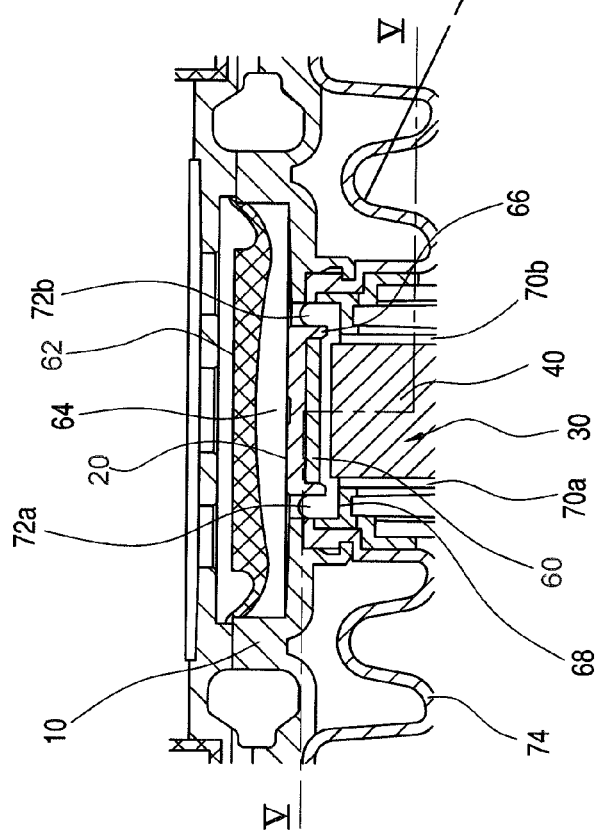
FIG. 4A
FIG. 4B

US 9,022,368 B2

MOTOR MOUNT FOR A MOTOR VEHICLE

CROSS REFERENCE TO RELATED APPLICATIONS

This application is a continuation application of international patent application PCT/EP2011/060086, filed Jun. 17, 2011, designating the United States and claiming priority from German applications 10 2010 037 178.5 and 10 2010 060 885.8, filed Aug. 26, 2010 and Nov. 30, 2010, respectively, and the entire contents of all the above applications are incorporated herein by reference.

FIELD OF THE INVENTION

The invention relates to a switchable, hydraulic damping mount, in particular an engine mount for a motor vehicle, which includes the following parts: a work chamber which is filled with a hydraulic fluid; a compensation chamber which is connected to the work chamber via a channel; a partition wall which separates the work chamber from the compensation chamber; at least one ferromagnetic magnetic diaphragm arranged in the partition wall in such a way that it can be deflected in the longitudinal direction of the mount; and, an electromagnetic switching actuator by means of which the diaphragm can be controlled.

BACKGROUND OF THE INVENTION

An engine mount of the type specified in the introduction is known from U.S. Pat. No. 4,789,142. In the engine mount known from this document, the partition wall has a bypass opening in addition to the channel through which the hydraulic fluid can flow back and forth between the work chamber and the compensation chamber. In the bypass opening there is situated the ferromagnetic diaphragm which has an upper and a lower stop as viewed in the longitudinal direction of the engine mount. Below the diaphragm and below the compensation chamber there is arranged an electromagnetic switching actuator in the form of an electrically conductive coil, by means of which the diaphragm can be controlled. It is thus possible for the coil to be energized in such a way that the diaphragm is situated either in its lower stop position or in its upper stop position, in which the bypass opening is closed in each case. Furthermore, it is possible for the coil to be energized in such a way that the diaphragm assumes any desired position between the lower stop position and the upper stop position. The diaphragm then opens up the bypass opening such that hydraulic fluid can flow back and forth between the work chamber and the compensation chamber. Through targeted adjustment of the position of the diaphragm between the upper and the lower stop by means of the coil, it is furthermore possible for the volume of the work chamber to be adapted to the present demands on the engine mount.

With the hydraulic mount disclosed in U.S. Pat. No. 4,789, 142, it is possible for low-frequency vibrations to be damped by virtue of hydraulic fluid flowing back and forth via the channel between the work chamber and the compensation chamber of the engine mount. Furthermore, high-frequency vibrations which are introduced into the engine mount can thereby be kept away from the body of the motor vehicle by virtue of the bypass being opened by means of the ferromagnetic diaphragm and the diaphragm being actuated by the coil in such a way that the volume of the work chamber remains approximately constant. It must, however, be noted that the coil of the electromagnetic switching actuator must be constantly energized in order to control the diaphragm. This applies both in the situation in which the diaphragm is to be held in the upper or the lower stop position and also in the situation in which the diaphragm is to be held between these positions. This leads to a high electrical consumption of the electromagnetic switching actuator.

SUMMARY OF THE INVENTION

It is an object of the invention to provide a switchable, hydraulically damping mount, in particular a motor mount for a motor vehicle, which has a low electrical consumption.

The above object is achieved, in that the switching actuator is formed such that, in the deenergized state, the actuator exerts a magnetic holding force on the diaphragm and fixes the diaphragm in a rest position, and in the energized state, the actuator reduces the magnetic holding force to such an extent that the diaphragm is released for a movement in the longitudinal direction of the mount.

An advantage of the invention is considered to be that of the electromagnetic switching actuator and thus the switchable mount has only a low electrical consumption. This can be understood by considering the following: vibrations during driving operation of the vehicle are damped by means of the switchable mount by virtue of hydraulic fluid flowing back and forth via the channel between the work chamber and the compensation chamber. Vibrations when the vehicle is at idle (referred to hereinafter as idle vibrations; these arise when the engine is running, for example, when the vehicle is stopped at a red traffic signal and is at idle), which vibrations act on the mount, are by contrast influenced by means of the diaphragm which, for this purpose, must be freely movable in the longitudinal direction of the mount. During normal driving operation, freedom of movement of the diaphragm is not required, such that the diaphragm may be fixed in its rest position. According to the invention, the electromagnetic switching actuator then requires no electrical current. Rather, the electromagnetic switching actuator requires electrical current only when idle vibrations act on the engine mount.

An embodiment of the invention is characterized in that the switching actuator includes the following parts: a permanent magnet; ferromagnetic elements; and, an electrically conductive coil through which an electrical current flows when the switching actuator is in the energized state. The parts of the switching actuator are arranged relative to one another such that, when the switching actuator is in the deenergized state, the magnetic flux originating from the permanent magnet is conducted via the ferromagnetic elements through the diaphragm, such that the diaphragm is attracted by the holding force exerted by the permanent magnet, and that, when the switching actuator is in the energized state, the magnetic flux originating from the permanent magnet is diverted in such a way that the magnetic flux is not conducted through the diaphragm, such that the holding force exerted by the permanent magnet is reduced to such an extent that the diaphragm is released for a movement in the longitudinal direction of the mount.

An advantage of this embodiment of the invention can be seen in the fact that the diaphragm can be securely fixed in its rest position by the permanent magnet because a large magnetic force can be exerted on the diaphragm by means of the permanent magnet. A further advantage of the refinement is that the switching actuator has a small structural volume, because an adequately large magnetic force can be exerted on the diaphragm by means of only a small permanent magnet.

An embodiment of the invention is characterized in that the switching actuator includes the following parts: a pot which is made of ferromagnetic material and on the base of which the permanent magnet is arranged in such a way that the magnetic field in the permanent magnet points in the longitudinal direction of the pot; and, a ferromagnetic core which is arranged above the permanent magnet, the longitudinal axis of which points in the longitudinal direction of the pot and around the longitudinal axis of which the coil is wound, wherein an air gap remains between the pot and the core. The switching actuator is aligned in the mount in such a way that the coil is situated between the diaphragm and the permanent magnet and the longitudinal direction of the pot runs parallel to the longitudinal direction of the mount.

An advantage of this embodiment can be seen in the fact that the switching actuator has a compact construction.

In another embodiment of the invention, the air gap between the pot and the core is sealed by means of an electrically insulating sealing compound. An advantage of this embodiment can be seen in the fact that the coil is fixed securely in its position in the switching actuator by the sealing compound. A further advantage of the invention can be seen in the fact that the parts of the switching actuator are protected against environmental influences by the sealing compound.

In another embodiment of the invention, the switching actuator is arranged on that side of the partition wall which faces away from the work chamber. An advantage of this embodiment can be seen in the fact that the switching actuator is arranged outside the work chamber, and thus the volume of the work chamber is not reduced by the switching actuator.

Another embodiment of the invention is characterized in that the partition wall comprises an upper part and a lower part and has a bypass channel which connects the work chamber to the compensation chamber and in that the diaphragm is situated in the bypass channel and corresponds in cross section to the cross section of the bypass channel. Here, the diaphragm, when in the rest position, blocks the bypass channel and the freedom of movement of the released diaphragm in the longitudinal direction of the bypass channel is delimited by the upper part and the lower part of the partition wall.

An advantage of this embodiment can be understood by considering the following: when the switching actuator is in the deenergized state, the diaphragm in the bypass channel can move freely. Since the cross section of the diaphragm however corresponds to the cross section of the bypass channel, no hydraulic fluid flows from the work chamber to the compensation chamber, or in the opposite direction, during a movement of the diaphragm in the bypass channel. Rather, it is merely the case that the diaphragm is moved upward and downward. An advantage of this embodiment can thus be seen in the fact that only a change in volume of the work chamber is effected by means of the diaphragm which is freely movable in the bypass channel. As a result of the change in volume of the work chamber, it is possible for idle vibrations to be prevented from being introduced into the body of the vehicle via the engine mount. Furthermore, no dynamic fluid-induced hardening of the work chamber occurs, because the hydraulic fluid can flow out of the work chamber.

In another embodiment of the invention, the diaphragm in the bypass channel is surrounded by an annular decoupling diaphragm which is situated between the upper part and the lower part of the partition wall. An advantage of this embodiment can be seen in the fact that, by means of the annular decoupling diaphragm, it is possible to influence vibrations in a frequency range other than that in which influence can be exerted by means of the diaphragm which is actuated by means of the electromagnetic switching actuator. The switchable mount is thus made effective over a broader range.

In another embodiment of the invention, the diaphragm has a disc-shaped form and is clamped at its edge between an upper part and a lower part of the partition wall. The diaphragm is acted on with hydraulic fluid on the surface facing toward the work chamber and is acted on with air on the surface facing away from the work chamber. An advantage of this embodiment can be seen in the fact that the mount exhibits no dynamic hardening in the event of idle vibrations, because the air under the diaphragm is compressible.

In another embodiment of the invention, the diaphragm is embedded in rubber. An advantage of this embodiment can be seen in the fact that the diaphragm does not generate any noises when it abuts against other parts of the switching actuator, for example against the partition wall.

In another embodiment of the invention, there is arranged in the partition wall a second diaphragm which can be deflected in the longitudinal direction of the mount and which influences the volume of the work chamber. Between the first diaphragm and the second diaphragm, there is arranged an air chamber which is closed off in an airtight manner with respect to the atmosphere when the switching actuator is in the deenergized state and which is connected to the atmosphere when the switching actuator is in the energized state. The switchable mount is hardened when the air chamber is closed off in an airtight manner with respect to the atmosphere, because in this state of the mount, the second diaphragm can move only slightly. By contrast, the switchable mount has a soft characteristic if the air chamber is connected to the atmosphere, because the second diaphragm can then move in the longitudinal direction of the mount counter to the atmospheric air pressure. If the switchable mount is used as an engine mount for a motor vehicle, the air chamber is connected to the atmosphere when idle vibrations act on the mount. An advantage of the embodiment can be seen in the fact that the first diaphragm and the second diaphragm are decoupled from one another. This makes it possible for the first diaphragm to be controlled by means of small forces, because it is not exposed to the forces exerted on the second diaphragm by the compensation chamber. Accordingly, the switching actuator in the mount need generate only small forces and can be of small design.

In another embodiment of the invention, the first diaphragm is a constituent part of the rolling diaphragm which delimits the volume of the compensation chamber to the outside. An advantage of this embodiment can be seen in the fact that the first diaphragm can be introduced, as a single component with the rolling diaphragm, into the mount, which simplifies the production of the mount. A further advantage of this embodiment can be seen in the fact that a rolling diaphragm with an integrated first diaphragm can be produced at low cost.

Another embodiment of the invention provides that the mount has at least one ventilation slot via which the air chamber can be connected to the atmosphere, and that the first diaphragm has at least one window via which the air chamber can be connected to the ventilation slot, and that, when the switching actuator is in the deenergized state, the first diaphragm bears with an annular sealing lip against a sealing seat in such a way that the connection for the air situated in the air chamber from the window to the ventilation slot is blocked.

An advantage of this embodiment can be seen in the fact that the damping characteristic of the mount in the high-frequency range can be set by means of the cross section of the ventilation slots.

In another embodiment of the invention, the at least one ventilation slot runs radially at the outside on the pot of the switching actuator. An advantage of this embodiment can be seen in the fact that the ventilation slots are situated in the direct vicinity of the switching actuator such that they can be separated from the window of the first diaphragm in a simple manner by the sealing lip.

BRIEF DESCRIPTION OF THE DRAWINGS

The invention will now be described with reference to the drawings wherein:

FIG. 1 is a schematic showing a switchable mount according to an embodiment of the invention;

FIG. 4A shows a switchable mount according to still another embodiment of the invention;

FIG. 4B is an enlarged view of a detail of FIG. 4A showing the region of the switching actuator; and, FIG. 5 shows a section along the line V-V in FIG. 4B.

DESCRIPTION OF THE PREFERRED EMBODIMENTS OF THE INVENTION

Figure 2A:
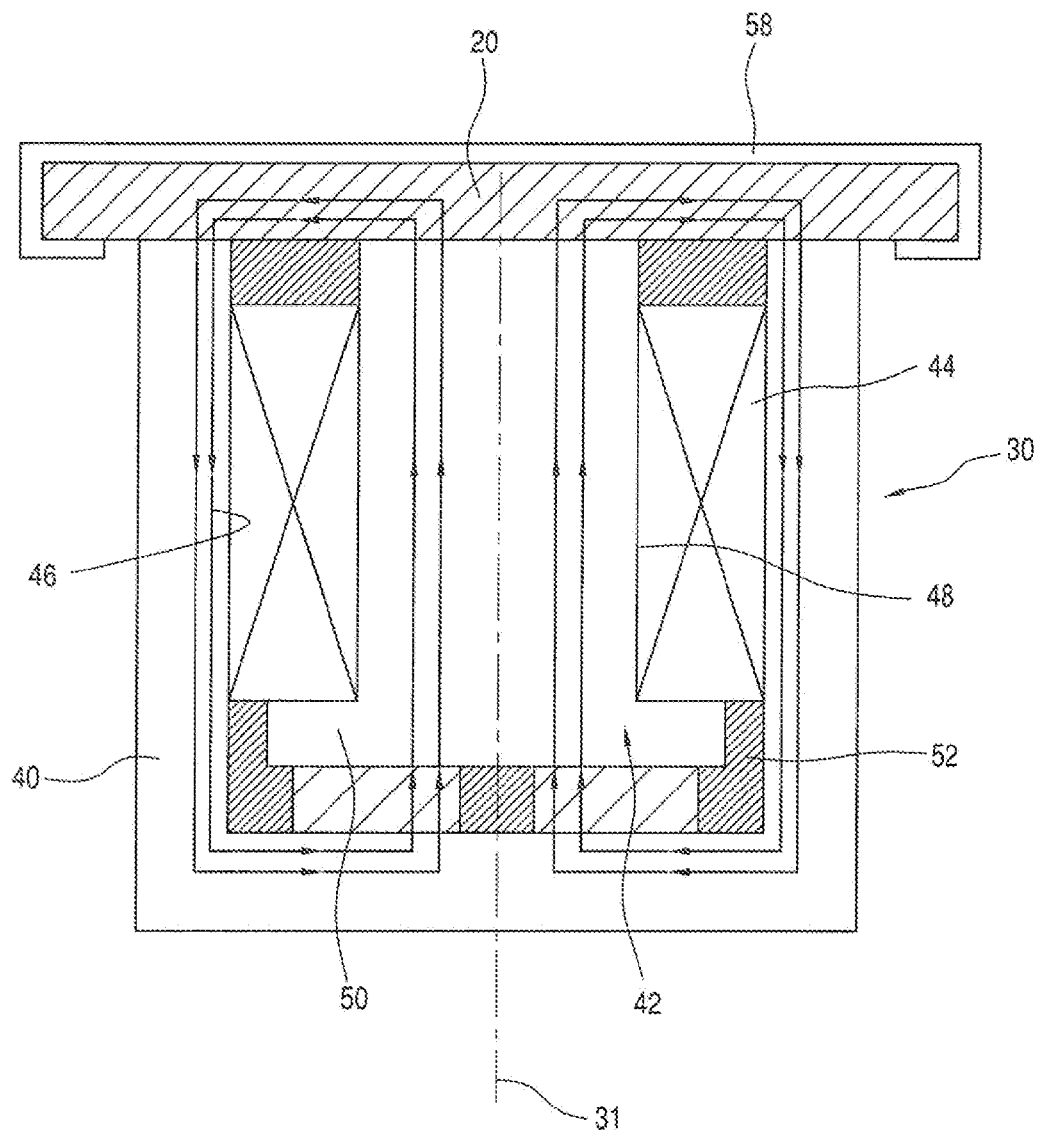
FIG. 2A is a schematic showing the switching actuator in the deenergized state.

FIG. 1 is a schematic of a switchable, hydraulic damping mount in the form of a switchable engine mount for a motor vehicle. Engine mounts of this kind are known per se, and therefore the basic construction shall be explained here only briefly. Here, only those parts of the engine mount known per se which are relevant to the invention will be discussed. The engine mount 2 is rotationally symmetrical about its longitudinal axis and comprises a lug 4 on which the engine of a motor vehicle is suspended. Furthermore, the engine mount 2 comprises a work chamber 6 and a compensation chamber 8 which are each filled with hydraulic fluid and which are separated from one another by a partition wall 10. The partition wall 10 is composed of an upper part 12 and of a lower part 14 and comprises an annular channel 16 via which the work chamber 6 is connected, in a manner known per se, to the compensation chamber 8. Furthermore, the partition wall 10 comprises a bypass channel 18. A disc-shaped diaphragm 20 composed of iron or some other ferromagnetic material is situated in the bypass channel 18. The cross section of the diaphragm corresponds to the cross section of the bypass channel 18. The diaphragm 20 is arranged in the partition wall 10 or in the bypass channel 18 in such a way that it can be deflected in the longitudinal direction of the mount. Here, the freedom of movement of the diaphragm 20 in the upward direction (that is, in the direction of the work chamber) is delimited by a stop 22 on the upper part 12. Furthermore, the freedom of movement of the diaphragm in the downward direction (that is, in the direction of the compensation chamber 8) is delimited by a stop 24 on the lower part 14. That surface of the diaphragm 20 which faces toward the work chamber 6 is connected to the hydraulic fluid in the work chamber 6 by the opening 26 in the upper part 12. Furthermore, the underside of the diaphragm 20 is connected to the hydraulic fluid in the compensation chamber 8 via an annular channel 28.

In addition to the parts already mentioned, the engine mount also includes an electromagnetic switching actuator 30 by means of which the ferromagnetic diaphragm 20 can be switched. The switching actuator 30 is arranged under the diaphragm 20 on that side of the partition wall 10 which faces away from the work chamber 6. The switching actuator is designed such that, in the deenergized state, it exerts a magnetic holding force on the diaphragm 20 and fixes the diaphragm 20 in a rest position. In the exemplary embodiment of the engine mount 2 shown in FIG. 1, the diaphragm 20 bears, in its rest position, against the stop 24 on the lower part 14 of the partition wall 10, such that the bypass channel 18 is blocked. Furthermore, the switching actuator 30 is designed such that, in the energized state, it reduces the magnetic holding force to such an extent that the diaphragm 20 is released for a movement in the longitudinal direction of the engine mount 2. The diaphragm 20 can then move freely between the stop 22 and the stop 24, and opens up the bypass channel 18.

In addition to the parts already mentioned, the engine mount 2 includes an annular decoupling diaphragm 32 which is situated between the upper part 12 and the lower part 14 of the partition wall 10 and which surrounds the magnetic diaphragm 20. The top side of the decoupling diaphragm 32 is acted on, through windows 34 in the upper part 12, by the hydraulic fluid in the work chamber 6. The underside of the decoupling diaphragm 32 is acted on, through windows 36 in the lower part 14, by the hydraulic fluid in the compensation chamber 8.

The operation of the switchable engine mount is as follows: if, during normal driving operation, vibrations are introduced into the engine mount 2 by the engine (not shown), hydraulic fluid is transferred from the work chamber 6 into the compensation chamber 8 (or in the opposite direction) via the annular channel 16. Here, owing to the throttling action of the annular channel 16, the vibrations introduced into the mount are damped. While these vibrations are being introduced, the diaphragm 20 is fixed in its rest position by the switching actuator 30, and assumes the position shown in FIG. 1. The bypass channel 18 is then closed. For idle vibrations with frequencies higher than those of the vibrations occurring during normal driving operation, the annular channel 16 is dynamically closed off such that then no hydraulic fluid can be transported back and forth between the work chamber 6 and the compensation chamber 8. While idle vibrations are being introduced into the engine mount 2, the switching actuator 30 is switched into the energized state, such that the magnetic holding force of the switching actuator 30 is reduced to such an extent that the diaphragm 20 is released for a movement in the longitudinal direction of the engine mount 2. The introduced idle vibrations are then compensated in that the volume of the work chamber 6 is held constant by a movement of the diaphragm 20 in the bypass channel 18. This is realized by virtue of the diaphragm 20 in the bypass channel 18 moving freely up and down (this means that the diaphragm 20 is moved up and down only by the pressure applied to the diaphragm 20 by the hydraulic fluid in the work chamber 6 and in the compensation chamber 8; when the switching actuator 30 is in the energized state, the movement of the diaphragm 20 in the bypass channel 18 is not influenced by this switching actuator).

Vibrations at other frequencies which are introduced into the engine mount 2 can be compensated in a manner known per se by means of the decoupling diaphragm 32.

Figure 2B:
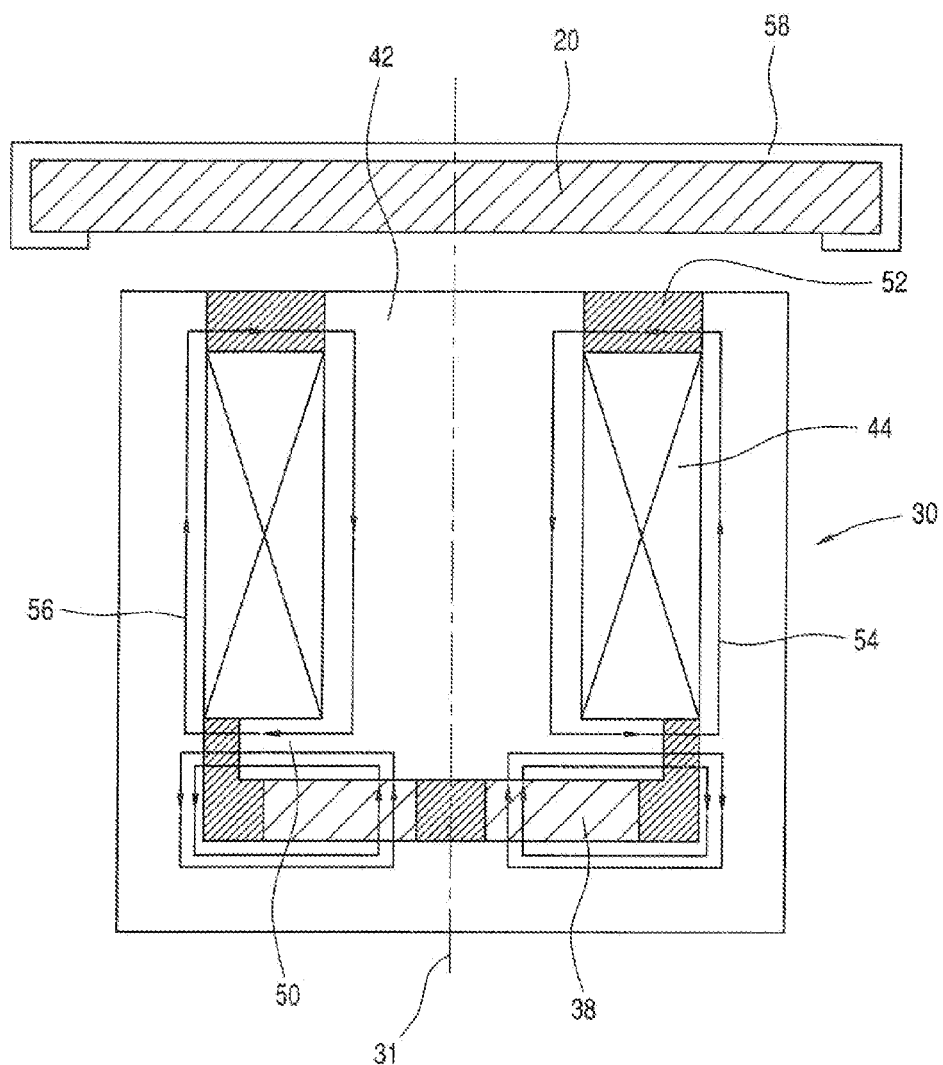
FIG. 2B is a schematic showing the switching actuator in the energized state.

FIGS. 2A and 2B are schematics of the electromagnetic switching actuator 30 which is rotationally symmetrical about its longitudinal axis. Here, FIG. 2A shows the deenergized state of the switching actuator 30, and FIG. 2B shows the energized state of the switching actuator 30. The switching actuator 30 will firstly be explained on the basis of FIG. 2A. The switching actuator comprises an annular permanent magnet 38, a first ferromagnetic element in the form of a pot 40, and a second ferromagnetic element in the form of a ferromagnetic core 42. Furthermore, the switching actuator 30 comprises an electrically conductive coil 44 (the line supplying electrical current to the coil and the line discharging electrical current from the coil are not shown). The annular permanent magnet 38 is arranged on the base of the pot 40. The ferromagnetic core 42 is mounted on the permanent magnet 38. The core 42 terminates, at its top end, with the pot 40, and is dimensioned in terms of its width such that a gap remains between the inner wall 46 of the pot 40 and the lateral surface 48 of the core 42. The coil 44 is wound around the core 42 and fills out the gap between the inner wall 46 and the lateral surface 48. The core 42 comprises, at its lower end, a collar 50 which projects radially outward beyond the lateral surface 48 of the core 42. The gap between the inner wall 46 of the pot 40 and the lateral surface 48 of the core 42 is thus considerably smaller in the region of the collar 50 than in the remaining region of the core 42. The coil 44 rests on the collar 50. The remaining cavities in the pot 40 are sealed by means of a sealing compound 52.

The operation of the switching actuator 30 in the deenergized state will be explained below: the permanent magnet 38 is designed such that the magnetic field in the interior thereof runs from bottom to top parallel to the longitudinal axis 31 of the switching actuator 30 as indicated by the arrows in the permanent magnet 38. When the switching actuator is in the deenergized state, the magnetic field generated by the permanent magnet 38 is conducted in the interior of the coil 44 through the ferromagnetic core 42, parallel to the longitudinal axis of the switching actuator 30. At the top end of the pot, the magnetic field lines emerge from the pot 40 and are diverted in the ferromagnetic diaphragm 20 as shown in FIG. 2A. Radially at the outside, the magnetic field lines enter into the pot 40 of the switching actuator 30 and run parallel to the longitudinal axis 31 of the switching actuator 30 to the bottom end of the pot 40. Finally, the magnetic field lines are diverted in the base of the pot 40 as shown in FIG. 2A, and finally arrive at the permanent magnet 38 again. The magnetic field lines originating from the permanent magnet 38 are thus closed via the core 42, the ferromagnetic diaphragm 20 and the pot 40. Owing to the closed magnetic field lines, a magnetic holding force is exerted on the diaphragm 20, which magnetic holding force fixes the diaphragm 20 in the rest position in which it rests on the pot 40, as shown in FIG. 2A. The radially outer ends of the diaphragm 20 then rest on the stop 24 of the lower part 14 of the partition wall 10, as shown in FIG. 1.

In conjunction with FIG. 2B, it will be described below how the switching actuator 30 performs in the energized state. An electrical current is conducted through the coil 44 in such a way that a magnetic field is built up by the coil 44. This magnetic field is indicated by the arrows 54 and 56. The magnetic field of the coil 44 runs, in the interior thereof, through the core 42 from the top end to the bottom end of the pot 40. In the pot 40, the magnetic field generated by the coil 44 runs from bottom to top, as is also indicated by the magnetic field lines 54 and 56. The magnetic field lines (54, 56) are closed at their bottom end via the collar 50 and at their top end via the sealing compound 52. The magnetic field lines (54, 56) generated by the energized coil 44 thus run, in terms of their orientation, in the opposite direction to the magnetic field lines generated by the permanent magnet 38, as shown in FIG. 2A. This has the effect that the magnetic field lines shown in FIG. 2A are displaced by the magnetic field lines (54, 56) of the coil 44 and can no longer run through the core 42 into the diaphragm 20. Instead, the magnetic field lines originating from the permanent magnets 38 are short-circuited via the collar 50, and thus run from the permanent magnets 38, through the collar 50 into the pot 40, through the base of the pot 40, and from there back into the permanent magnet 38, as shown in FIG. 2B. As a result of this defined short-circuiting of the magnetic field lines via the collar 50 of the core 42, the magnetic holding force of the permanent magnet is reduced to such an extent that the permanent magnet 38 can no longer fix the diaphragm 20 in its rest position. The diaphragm 20 is also not fixed in its rest position by the magnetic field of the coil 44, because this magnetic field is too weak. The diaphragm 20 is thus released for a movement in the longitudinal direction of the mount (see FIG. 1).

The switching of the switching actuator 30 from the deenergized state into the energized state and vice versa is performed as required by a control unit of the motor vehicle into which the engine mount is installed.

The ferromagnetic diaphragm 20 is preferably embedded into a rubber layer 58. Furthermore, the switching actuator 30 shown in FIGS. 2A and 2B is arranged in the engine mount 2 (see FIG. 1) in such a way that the coil 44 is situated between the diaphragm 20 and the permanent magnet 38, and the longitudinal direction of the pot 40 runs parallel to the longitudinal direction of the mount 2.

Figure 3:
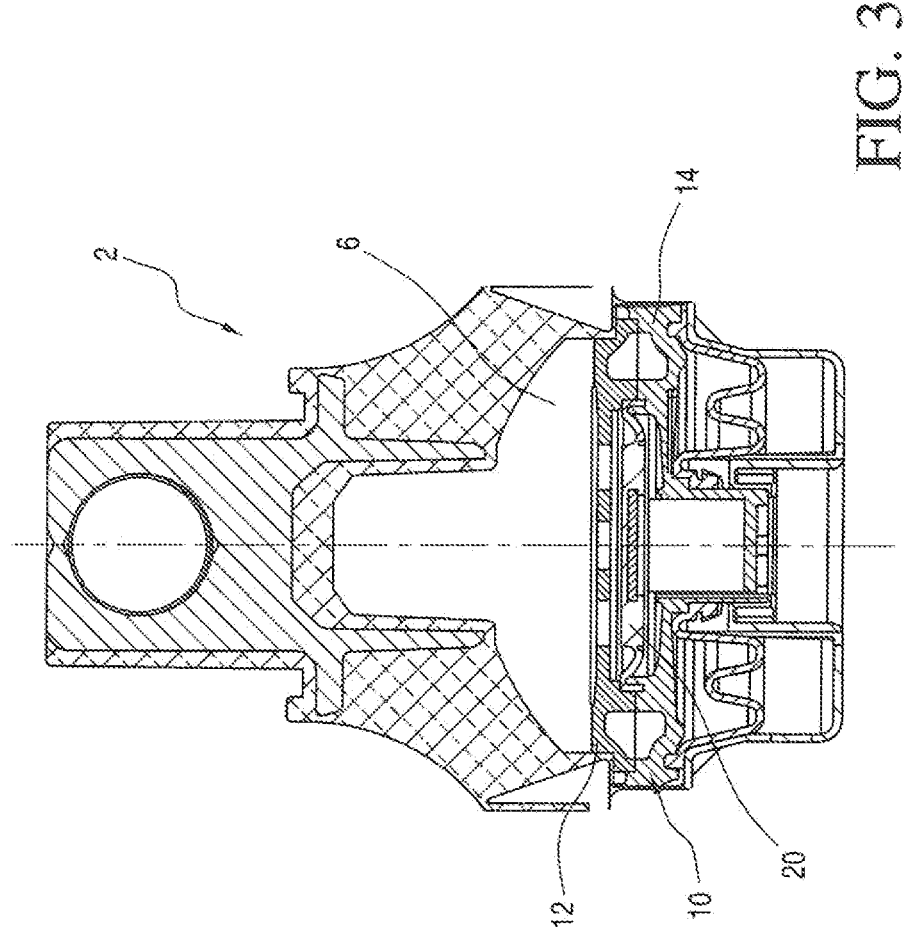
FIG. 3 shows a switchable mount according to another embodiment of the invention.

FIG. 3 shows an engine mount 2 which is of substantially the same construction as the engine mount 2 shown in FIG. 1. In particular, the switching actuator 30 is of the same construction as that which has been explained in conjunction with FIGS. 2A and 2B. The only difference in relation to the engine mount 2 as per FIG. 1 can be seen in the fact that the disc-shaped diaphragm 20 is clamped at its edge between the upper part 12 and the lower part 14 of the partition wall 10, wherein the diaphragm 20 is acted on by hydraulic fluid on the surface facing toward the work chamber 6 and is acted on by air on the surface facing away from the work chamber 6. Furthermore, the engine mount 2 shown in FIG. 3 has no additional decoupling diaphragm.

FIGS. 4A and 4B show an engine mount 2 having a switching actuator 30 of the same construction as that which has been explained in conjunction with FIGS. 1 to 3. In the following description of the figures, reference is made to FIG. 4B, which shows an enlarged detail of FIG. 4A. The partition wall 10 of the switching actuator 2 comprises a first diaphragm 20 which can be controlled by the switching actuator 30. The diaphragm 20 is composed of a circular metal plate 60 which is embedded in the elastomer of the diaphragm 20. Furthermore, the first diaphragm 20 is an integral part of the rolling diaphragm 74 which delimits the compensation chamber 8 to the outside. In addition to the first diaphragm 20, the partition wall 10 comprises a second diaphragm 62 which can be deflected in the longitudinal direction of the engine mount 2 and by means of which the volume of the work chamber 6 (see FIG. 4A) can be influenced in a manner known per se. An air chamber 64 is arranged between the first diaphragm 20 and the second diaphragm 62. When the switching actuator 30 is in the deenergized state, the air chamber 64 is closed off in an air-tight manner with respect to the atmosphere. In the event of a deformation of the work chamber 6 (see FIG. 4A), the second diaphragm 62 then has to act counter to the air pressure in the air chamber 64, such that the engine mount 2 is in a hard setting. In the energized state of the switching actuator 30, the air chamber 64 is connected to the atmosphere. In the event of a change in volume of the work chamber 6, the second diaphragm 62 then has to act merely counter to the atmospheric air pressure, such that the engine mount 2 is in a soft setting.

It will be described below how the air chamber 64 can be closed off in an air-tight manner with respect to the atmosphere and connected to the atmosphere. Here, on the basis of FIG. 4B, the state in which the air chamber 64 is closed off in an air-tight manner with respect to the atmosphere will firstly be described. In this situation, an annular sealing lip 66 of the first diaphragm 20 rests on a sealing seat 68 which surrounds the switching actuator 30. In the radially inner region of the sealing lip 66, there are situated ventilation slots 70a and 70b which run radially along the outside of the pot 40 of the switching actuator 30 in the longitudinal direction of the mount 2. The ventilation slots 70a and 70b are connected to the atmosphere. Radially outside the sealing lip 66, the diaphragm 20 comprises windows (72a, 72b). When the actuator is in the deenergized state, that is, when the diaphragm 20 is resting with the sealing lip 66 on the sealing seat 68, a connection of the windows (72a, 72b) to the ventilation slots (70a, 70b) is blocked by the annular sealing lip 66. Accordingly, no air can escape from the air chamber 64 into the atmosphere via the ventilation slots (70a, 70b). When the switching actuator is in the energized state, the sealing lip 66 is lifted from the sealing seat 68 (this state is shown in FIG. 4B) such that the air chamber 64 is connected to the atmosphere via the windows (72a, 72b) and via the ventilation slots (70a, 70b).

Figure 5:
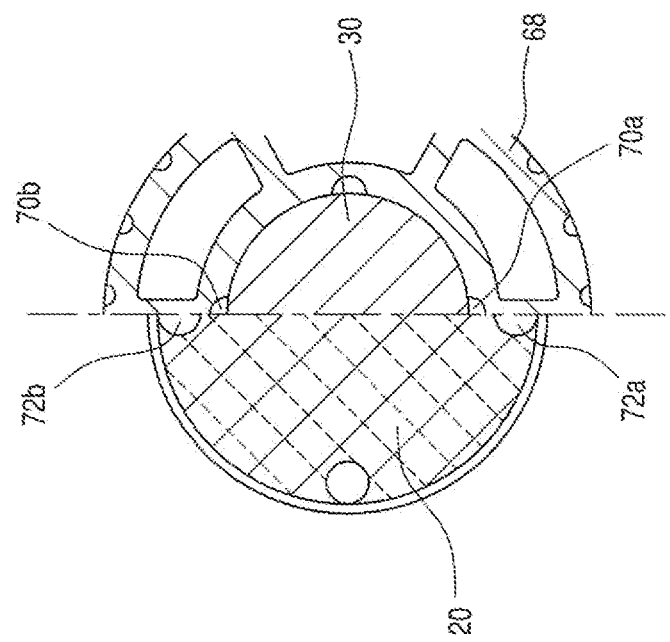

FIG. 5 shows a section along the line V-V of FIG. 4B. The diaphragm 20 comprises, distributed over its circumference, a plurality of windows (72a, 72b). The diaphragm 20 preferably comprises at least four windows 72. Furthermore, a plurality of ventilation slots (70a, 70b) are arranged, so as to be distributed over the circumference in the direct radial vicinity of the switching actuator 30 (it is preferable for at least four ventilation slots 70 to be arranged over the entire circumference in the direct vicinity of the switching actuator 30). The windows 72 in the diaphragm 20 and the ventilation slots 70 are dimensioned such that the total cross-sectional area of the windows is larger than the total cross-sectional area of the ventilation slots. In this way, the diaphragm is prevented from being pressed against the sealing seat 68 (see FIGS. 4A and 4B) by the air flow when the air escapes from the air chamber 64 into the atmosphere via the windows 72 and the ventilation slots 70.

It is understood that the foregoing description is that of the preferred embodiments of the invention and that various changes and modifications may be made thereto without departing from the spirit and scope of the invention as defined in the appended claims.

LIST OF REFERENCE NUMERALS (Part of the Description)
2 Engine mount
4 Lug
6 Work chamber
8 Compensation chamber
10 Partition wall
12 Upper part
14 Lower part
16 Annular channel
18 Bypass channel
20 Diaphragm
24 Stop
26 Opening
28 Annular channel
30 Switching actuator
31 Longitudinal axis
32 Decoupling diaphragm
34 Windows
36 Windows
38 Permanent magnet
40 Pot
42 Core
44 Coil
46 Inner wall
48 Lateral surface
50 Collar
52 Sealing compound
54 Magnetic field line
56 Magnetic field line
58 Rubber layer
60 Metal plate
62 Diaphragm
64 Air chamber
66 Sealing lip
68 Sealing seat
70a, 70b Ventilation slot
72a, 72b Windows
74 Rolling diaphragm

What is claimed is:

1. A switchable, hydraulic damping mount comprising:
a work chamber configured to be filled with hydraulic fluid;
a channel;
a compensation chamber connected to said work chamber via said channel;
a partition wall separating said work chamber from said compensation chamber;
the mount defining a longitudinal direction;
at least one ferromagnetic diaphragm arranged in said partition wall so as to be deflectable in said longitudinal direction of the mount;
said diaphragm having a rest position;
an electromagnetic switching actuator having a deenergized state and an energized state and configured to control said diaphragm; and,
said switching actuator having a permanent magnet to exert a magnetic holding force on said diaphragm and fix said diaphragm in said rest position when said switching actuator is in said deenergized state and having an electromagnet to reduce said magnetic holding force to such an extent that said diaphragm is enabled for movement in the longitudinal direction of the mount when said switching actuator is in said energized state.

2. The switchable mount of claim 1, wherein said mount is a motor mount for a motor vehicle.

3. The switchable mount of claim 1, wherein:
said partition wall has a first side which faces away from said work chamber; and,
said switching actuator is arranged on said first side of said partition wall.

4. The switchable mount of claim 1, wherein:
said partition wall has an upper portion, a lower portion, and a bypass channel connecting said work chamber to said compensation chamber;
said bypass channel defines a bypass channel cross-section and a bypass channel longitudinal direction;
said diaphragm is disposed in said bypass channel;
said diaphragm has a cross-section corresponding to said bypass channel cross-section;
said diaphragm is configured to block said bypass channel when in said rest position; and,
said upper portion and said lower portion of said partition wall are configured to limit the movement of said diaphragm in said bypass channel longitudinal direction when said diaphragm is enabled.

5. The switchable mount of claim 4, further comprising an annular decoupling diaphragm disposed between said upper portion and said lower portion of said partition wall and configured to surround said diaphragm in said bypass channel.

6. The switchable mount of claim 1, wherein:
said partition wall has an upper portion and a lower portion;
said diaphragm is disc-shaped, has an edge and is clamped between said upper portion and said lower portion of said partition wall; and,
said diaphragm has a first surface facing said work chamber which is acted upon by said hydraulic fluid and a second surface facing away from said work chamber which is acted upon by air.

7. The switchable mount of claim 1, wherein said diaphragm is embedded in rubber.

8. The switchable mount of claim 1, wherein said diaphragm is a first diaphragm and said work chamber defines a work chamber volume, said switchable mount further comprising:
a second diaphragm arranged in said partition wall and configured to be deflectable in the longitudinal direction of the mount and to influence said work chamber volume; and,
said first diaphragm and said second diaphragm conjointly define an air chamber therebetween closed off airtight with respect to the atmosphere when said switching actuator is in said deenergized state and communicating with the atmosphere when in said energized state.

9. The switchable mount of claim 8, wherein said compensation chamber defines a compensation chamber volume; said mount further comprises a rolling diaphragm delimiting said compensation chamber volume to the ambient; and, said first diaphragm is a component of said rolling diaphragm.

10. The switchable mount of claim 8, further comprising:
a sealing seat;
the mount defining at least one ventilation slot via which said air chamber can be connected to the atmosphere;
said first diaphragm having at least one window via which said air chamber can be connected to said ventilation slot; and,
said first diaphragm having an annular ceiling lip and being configured to, when said switching actuator is in said energized state, bear against said sealing seat with said ceiling lip in such a manner so as to block a connection of air in said air chamber from said window to said ventilation slot.

11. The switchable mount of claim 10, wherein:
said switching actuator has a pot having an outer side; and,
said ventilation slot extends radially on said outer side of said pot.

12. A switchable, hydraulic damping mount comprising:
a work chamber configured to be filled with hydraulic fluid;
a channel;
a compensation chamber connected to said work chamber via said channel;
a partition wall separating said work chamber from said compensation chamber;
the mount defining a longitudinal direction;
at least one ferromagnetic diaphragm arranged in said partition wall so as to be deflectable in said longitudinal direction of the mount;
said diaphragm having a rest position;
an electromagnetic switching actuator having a deenergized state and an energized state and configured to control said diaphragm;
said switching actuator being configured to exert a magnetic holding force on said diaphragm and fix said diaphragm in said rest position when said switching actuator is in said deenergized state and being further configured to reduce said magnetic holding force to such an extent that said diaphragm is enabled for movement in the longitudinal direction of the mount when said switching actuator is in said energized state;
said switching actuator including a permanent magnet having a magnetic flux emanating therefrom, at least two ferromagnetic elements, and an electrically conductive coil through which electrical current flows when said switching actuator is in said energized state; and,
said permanent magnet, said ferromagnetic elements and said electrically conductive coil being arranged relative to each other such that in said deenergized state of said switching actuator said magnetic flux originating at said permanent magnet is conducted via said ferromagnetic elements through said diaphragm so as to cause said diaphragm to be drawn in by said magnetic holding force exerted by said permanent magnet and, when said switching actuator is in said energized state, said magnetic flux emanating from said permanent magnet is so redirected that said magnetic flux bypasses said diaphragm so as to reduce said holding force exerted by said permanent magnet to an extent that said diaphragm is enabled for a movement in the longitudinal direction of the mount.

13. The switchable mount of claim 12, wherein:
said switching actuator has a pot defining a longitudinal direction;
said pot is made of a ferromagnetic material and has a base;
said permanent magnet generates a magnetic field and is arranged on said base of said pot in such a manner that said magnetic field in said permanent magnet points in the longitudinal direction of said pot;
said switching actuator further has a ferromagnetic core arranged above said permanent magnet and said ferromagnetic core defines a longitudinal axis which is parallel to said longitudinal direction of said pot;
said coil is wound about said longitudinal axis of said core;
said pot and said core conjointly define an air gap therebetween; and,
said switching actuator is aligned in the mount in such a manner that said coil lies between said diaphragm and said permanent magnet and further aligned in the mount such that said pot longitudinal direction is parallel to the longitudinal direction of the mount.

14. The switchable mount of claim 13 further comprising an electrically insulating potting mass configured to fill said air gap between said core and said pot.

15. The switchable mount of claim 12, wherein said mount is an engine mount for a motor vehicle.

* * * * *